(12) United States Patent
Liu

(10) Patent No.: US 11,570,745 B2
(45) Date of Patent: Jan. 31, 2023

(54) POSITIONING METHOD AND APPARATUS

(71) Applicant: BEIJING XIAOMI MOBILE SOFTWARE CO., LTD., Beijing (CN)

(72) Inventor: Xufeng Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 39 days.

(21) Appl. No.: 17/240,640

(22) Filed: Apr. 26, 2021

(65) Prior Publication Data

US 2022/0070820 A1 Mar. 3, 2022

(30) Foreign Application Priority Data

Aug. 31, 2020 (CN) .......................... 202010899294.1

(51) Int. Cl.
*H04W 64/00* (2009.01)
*H04W 4/02* (2018.01)

(52) U.S. Cl.
CPC ......... *H04W 64/006* (2013.01); *H04W 4/026* (2013.01)

(58) Field of Classification Search
CPC ............................ H04W 64/006; H04W 4/026
See application file for complete search history.

(56) References Cited

U.S. PATENT DOCUMENTS

| | | | |
|---|---|---|---|
| 2013/0238712 A1 | 9/2013 | Dearman | |
| 2015/0281979 A1 | 10/2015 | Kasher | |
| 2016/0231415 A1* | 8/2016 | Liao | ........................ G01S 5/0289 |
| 2018/0024507 A1 | 1/2018 | Godlieb | |
| 2019/0102943 A1 | 4/2019 | Fillhardt et al. | |

FOREIGN PATENT DOCUMENTS

| | | |
|---|---|---|
| CN | 105959917 A | 9/2016 |
| CN | 108051778 A | 5/2018 |
| CN | 108632744 A | 10/2018 |
| CN | 110389370 A | 10/2019 |
| CN | 110687503 A | 1/2020 |

OTHER PUBLICATIONS

Extended European Search Report in the European Application No. 21170818.5, dated Oct. 27, 2021, (10p).
He Wei, et, al. "Single Station and Single Antenna Direction Measurement Method Assisted by Path Planning", 2015 IEEE International Conference on Signal Processing, Communications and Computing(ICSPCC), Sep. 22, 2015, (5p).
Su Xin, et, al. "The Research on Single-antenna DGPS Determination Attitude Method Based on Tracking-differentiator", Journal of Projectiles, Rockets, Missiles and Guidance, vol. 31 No. 2, Apr. 2011, (4p).
First Office Action of the Chinese Application No. 202010899294.1, dated Mar. 1, 2022 with English translation, (13p).

* cited by examiner

*Primary Examiner* — Curtis B Odom
(74) *Attorney, Agent, or Firm* — Arch & Lake LLP

(57) ABSTRACT

A positioning method includes: acquiring first geographic orientation information of a second device and first relative orientation information of the first device relative to the second device; acquiring second geographic orientation information of the first device; and determining second relative orientation information of the second device relative to the first device according to the first geographic orientation information, the second geographic orientation information, and the first relative orientation information.

11 Claims, 4 Drawing Sheets

POSITIONING METHOD AND APPARATUS

CROSS-REFERENCE TO RELATED APPLICATION

This application is based on and claims priority to Chinese Patent Application No. 202010899294.1, filed on Aug. 31, 2020, the contents of which are incorporated herein by reference in their entirety for all purposes.

TECHNICAL FIELD

The present disclosure relates to the field of positioning technologies, and more particularly, to positioning methods and apparatuses.

BACKGROUND

Ultra Wide Band (UWB) technology is used to achieve short-range accurate positioning, and UWB has the advantage of accurate positioning compared to other similar technologies such as Bluetooth. In the related art, due to the size requirements of some electronic devices, only one UWB antenna is often installed and multiple UWB antennas cannot be installed. However, such single-antenna devices cannot implement the positioning of other devices.

SUMMARY

The present disclosure provides a positioning method and apparatus, and a computer storage medium.

According to a first aspect of the present disclosure, there is provided a positioning method applied to a first device. The method includes: acquiring first geographic orientation information of a second device and first relative orientation information of the first device relative to the second device; acquiring second geographic orientation information of the first device; and determining second relative orientation information of the second device relative to the first device according to the first geographic orientation information, the second geographic orientation information, and the first relative orientation information.

According to a second aspect of the present disclosure, there is provided a positioning method applied to a second device, the method includes: receiving a second request message transmitted by the first device; acquiring second geographic orientation information of the first device from the second request message; determining first geographic orientation information of the second device, and first relative orientation information of the first device relative to the second device; and determining second relative orientation information of the second device relative to the first device according to the first geographic orientation information, the second geographic orientation information, and the first relative orientation information.

According to a third aspect of the present disclosure, there is provided a positioning method applied to a second device, the method includes: receiving a third request message transmitted by the first device; determining first geographic orientation information of the second device and third relative orientation information of the first device relative to the second device; and transmitting the first geographical orientation information and the third relative orientation information to the first device.

According to a fourth aspect of the present disclosure, there is provided a positioning device. The device includes: a processor; and a memory for storing executable instructions. Herein the processor is configured to execute the executable instructions to implement the steps of the positioning method of the first aspect, the second aspect, or the third aspect.

It is to be understood that the foregoing general description and the following detailed description are explanatory only, and do not limit the present disclosure.

BRIEF DESCRIPTION OF THE DRAWINGS

The accompanying drawings, which are incorporated in and constitute a part of this Description, illustrate embodiments consistent with the present disclosure and, together with the description, serve to explain the principles of the disclosure. In the drawings.

DETAILED DESCRIPTION

Embodiments will be described in detail herein, examples of which are illustrated in the accompanying drawings. When the following description refers to the drawings, the same numbers in different drawings indicate the same or similar elements unless otherwise indicated. The embodiments described in the following embodiments do not represent all embodiments consistent with the disclosed embodiments. Instead, they are merely examples of apparatuses and methods consistent with aspects related to the disclosed embodiments as recited in the appended claims.

Note that although a term such as first, second, third may be adopted in an embodiment herein to describe various kinds of information, such information should not be limited to such a term. Such a term is merely for distinguishing information of the same type. For example, without departing from the scope of the embodiments herein, the first information may also be referred to as the second information. Similarly, the second information may also be referred to as the first information. Depending on the context, a "if" as used herein may be interpreted as "when" or "while" or "in response to determining that".

As used herein, the term "if" or "when" may be understood to mean "upon" or "in response to" depending on the context. These terms, if appear in a claim, may not indicate that the relevant limitations or features are conditional or optional.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Figure 1:
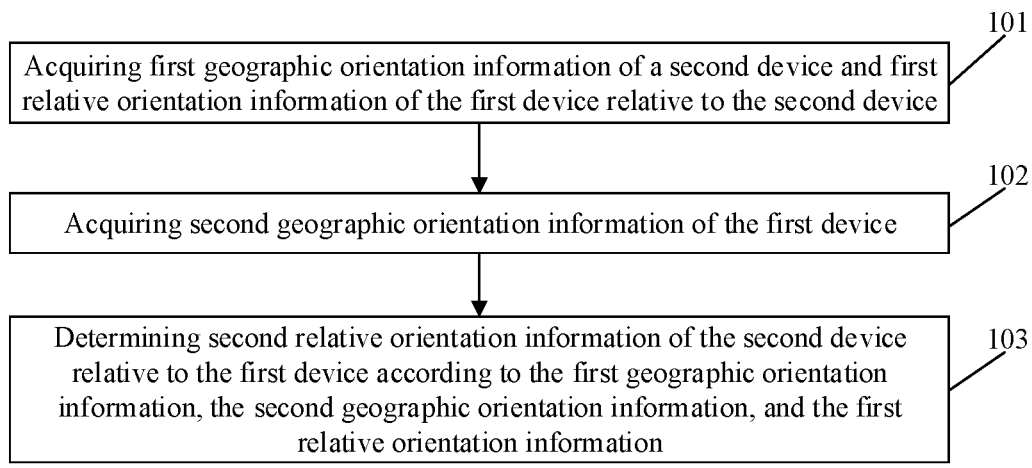
FIG. 1 is a flowchart illustrating a positioning method according to at least some embodiments.

In a first aspect, the present disclosure provides a positioning method. FIG. 1 is a flowchart illustrating a positioning method according to at least some embodiments. As shown in FIG. 1, the positioning method is applied to a first device, and the positioning method includes steps S101 to S103.

In step S101, the first geographic orientation information of a second device and first relative orientation information of the first device relative to the second device are acquired.

In step S102, the second geographic orientation information of the first device is acquired.

In step S103, the second relative orientation information of the second device relative to the first device is determined according to the first geographic orientation information, the second geographic orientation information, and the first relative orientation information.

In the related art, the short-range positioning of a device can be implemented through a UWB technology. However, due to the limitation of the technical solution, the multi-UWB antennas device is typically used for positioning a single UWB antenna device, but the single-antenna device cannot implement the positioning for the multi-UWB antennas device. Then, for some devices with small dimensions, such as a watch, a bracelet, a sound box, an alarm clock, a positioning device (positioning bean), and the like, cannot be installed with multiple antennas due to factors such as the size of the device. Therefore, the above wearable devices may only be used to implement the functions of being positioned and distance measuring. However, the function of positioning other devices cannot be implemented in these devices because of the limited space. According to the embodiments of the present disclosure, the function of the positioned device in which a UWB antenna is installed can be expanded, so that the positioned device can also position the device with the positioning function.

The positioning method in the embodiments of the present disclosure may be applied to various first devices. In some embodiments, the first device includes a single-antenna device, which may be an electronic device installed with a single UWB antenna. For another example, the first device includes, but is not limited to, a wearable device, a sound box, an alarm clock, or the like which is installed with a UWB antenna. In some embodiments, the second device may be a device with positioning function, for example, the second device includes a multi-antenna device, which may be an electronic device in which a plurality of UWB antennas are installed. In another example, the second device includes, but is not limited to, a device in installed with a plurality of UWB antennas, such as a mobile phone, a tablet computer, or the like. With the technical solution of the embodiments, positioning of the second device by the first device can be implemented.

Of course, even if the first device and the second device are both installed with a plurality of antennas, that is, in the case where both the first device and the second device are multi-antenna devices, if one of the devices does not use its own multi-antenna to directly position the correspondent node, but uses the positioning method provided in the present embodiment, it is possible to position the correspondent node by the positioning data provided by the correspondent node. Therefore, in some embodiments, the number of antennas of the first device may not be limited, that is, the first device may be a single-antenna device or a multi-antenna device. For example, the first device may be an electronic device in which a plurality of UWB antennas is installed, or an electronic device in which one UWB antenna is installed.

If the second device is a multi-antenna device, in an implementation process, the second device can acquire the different distances and/or angles from the antenna signals of each antenna to the first device, as well as the distances and/or position relationships among the antennas, and then calculate the first relative orientation information of the first device relative to the second device, and transmit the first relative orientation information to the first device. In other embodiments, the second device may also utilize its own geomagnetic sensor, acceleration sensor, and gravity sensor to obtain the first geographic orientation information of the second device and transmit the first geographic orientation information to the first device.

In the embodiment of the present disclosure, after the first device receives the first geographic orientation information and the first relative orientation information sent by the second device, the first device can obtain the second geographic orientation information of the first device by using its own geomagnetic sensor, acceleration sensor and gravity sensor, and perform calculation to acquire the second relative orientation information of the second device relative to the first device based on the acquired first geographic orientation information, the acquired first relative orientation information and the second geographic orientation information of the first device.

In some embodiments, the information exchange between the first device and the second device may be implemented through the communication manner such as Bluetooth or UWB. In other embodiments, the information exchange between the first device and the second device may be implemented through the communication manners such as a wireless local area network and a mobile communication network.

In some embodiments of the disclosure, the first device can determine the second relative orientation information of the second device relative to the first device according to the first geographic orientation information of the second device, the second geographic orientation information of the first device, and the first relative orientation information of the first device relative to the second device. With the technical solution provided in the present disclosure, the first device can be used to determine the second relative orientation information of the second device relative to the first device, so that the accurate positioning of the second device by the first device can be implemented. When the first device is a single-antenna device and the second device is a multi-antenna device, the positioning of the multi-antenna device by the single-antenna device can be implemented.

In some embodiments, the first geographic orientation information includes a first azimuth of the second device in a geographic coordinate system, the second geographic orientation information includes a second azimuth of the first device in the geographic coordinate system, and the first relative orientation information includes a first relative azimuth of the first device relative to the second device.

Determining the second relative orientation information of the second device relative to the first device according to the first geographic orientation information, the second geographic orientation information, and the first relative orientation information includes:

obtaining a second relative azimuth of the second device relative to the first device according to the first azimuth, the second azimuth, and the first relative azimuth.

Herein, the second device has a geomagnetic sensor, an acceleration sensor, and a gravity sensor. In an implementation process, the second device may acquire the first geomagnetic parameter based on the geomagnetic sensor, acquire a first acceleration parameter based on the acceleration sensor, acquire a first gravity parameter based on the gravity sensor, and perform calculation to acquire a first azimuth of the second device in the geographic coordinate system based on the first geomagnetic parameter, the first acceleration parameter, and the first gravity parameter. Herein, the first azimuth may be an included angle between the second device and the respective coordinate axes in the geographic coordinate system. The first azimuth is an absolute angle. In an embodiment, the first azimuth may be understood as an absolute orientation.

In some embodiments, three sensors, i.e., a geomagnetic sensor, an acceleration sensor, and a gravity sensor, may be registered with the second device with the first azimuth understood as the absolute orientation of the second device. During the use of the second device, the geographical direction of the second device may be determined based on the first geomagnetic parameter, the orientation angle of the second device in the geographical direction may be determined based on the first acceleration sensor, and the horizontal direction of the second device may be determined based on the first gravity parameter. Herein the geographical direction may be a natural direction, for example, a vertical downward direction, of the second device in the geographical coordinate system. Herein, the relative relationship between the second device and the geographical direction can be adjusted according to the current screen direction of the second device. For example, when the geographical direction of the second device is a vertical direction and the current screen direction is a horizontal screen, it is necessary to convert the azimuth relative to the geographical direction of the second device into the azimuth relative to the horizontal direction, and the converted azimuth may be the first azimuth.

The first device also has a geomagnetic sensor, an acceleration sensor, and a gravity sensor. In an implementation, the first device may acquire a second geomagnetic parameter based on the geomagnetic sensor, acquire a second acceleration parameter based on the acceleration sensor, acquire a second gravity parameter based on the gravity sensor, and perform calculation to acquire a second azimuth of the first device in the geographic coordinate system based on the second geomagnetic parameter, the second acceleration parameter, and the second gravity parameter. Herein, the second azimuth may be an included angle between the first device and the respective coordinate axes in the geographical coordinate system. And the second azimuth is an absolute angle. In an embodiment, the second azimuth may be understood as an absolute orientation.

In some embodiments, three sensors, i.e., a geomagnetic sensor, an acceleration sensor, and a gravity sensor, may be registered with the first device with the second azimuth understood as the absolute orientation of the first device. During the use of the first device, the geographical direction of the first device may be determined based on the second geomagnetic parameter, the orientation angle of the first device in the geographical direction may be determined based on the second acceleration sensor, and the horizontal direction of the first device may be determined based on the second gravity parameter. Herein the geographical direction may be a natural direction, for example, a vertical downward direction, of the first device in the geographical coordinate system. Herein, the relative relationship between the first device and the geographical direction can be adjusted according to the current screen direction of the first device. For example, when the geographical direction of the first device is a vertical direction and the current screen direction is a horizontal screen, it is necessary to convert the azimuth relative to the geographical direction of the first device into an azimuth relative to the horizontal direction, and the converted azimuth may be a second azimuth.

Since the second device is a multi-antenna device, in an implementation, the first relative azimuth of the first device relative to the second device can be calculated based on the different distances and/or angles from the antenna signals of the antennas in the second device to the first device, and the distance and/or position relationship between the respective antennas. After the first azimuth and the first relative azimuth are acquired, the second device transmits the first azimuth and the first relative azimuth to the first device.

After the first azimuth, the second azimuth, and the first relative azimuth are acquired, the first device may perform calculation to acquire the second relative azimuth of the second device relative to the first device based on the first azimuth, the second azimuth, and the first relative azimuth.

In an embodiment, it is assumed that the first device is a watch, the second device is a mobile phone, the first azimuth determined by the mobile phone is a south-facing orientation. Further, the mobile phone positions the watch based on the UWB to obtain the orientation of the watch relative to the mobile phone, that is, the first relative azimuth is 30 degrees north-west, and the second azimuth determined by the mobile phone is a north-facing orientation, then the azimuth of the mobile phone relative to the watch can be determined, that is, the second relative azimuth can be 30 degrees south-east. In the embodiment of the disclosure, the first azimuth of the second device in the geographical coordinate system and the second azimuth of the first device in the geographical coordinate system are determined respectively. After the first relative azimuth is determined, the geographical coordinate system can be used as the intermediate reference coordinate system, and the second relative azimuth of the second device relative to the first device is determined, thereby implementing the positioning of the mobile phone by the watch.

It is to be noted that the embodiments of the present disclosure do not define how the second device acquires the first relative azimuth of the first device relative to the second device.

In an embodiment, both the first azimuth and the second azimuth may be understood as the absolute azimuth, i.e., the orientation of the corresponding device is absolute (which is a principle similar to a compass), and the first relative orientation information is the relative orientation information determined based on the orientation of the device. If the relative azimuth of the first device relative to the second device is 45 degrees in the left front, the relative azimuth of the first device is determined as 45 degrees in the left front based on the orientation of the second device. The absolute azimuth corresponds to the relative azimuth is different with the different orientations of the second device. If the first azimuth of the second device is northward, the relative azimuth is 45 degrees northwestern, and if the first azimuth of the second device is southward, then the relative azimuth is 45 degrees southeastern. As can be seen, the absolute orientation information between the first device and the second device can be obtained through the absolute azimuth information such as the first azimuth of the second device according to the relative orientation information between the first device and the second device. The first device, can accurately determine the orientation information of the second device relative to itself according to its own second azimuth, thereby realizing the positioning of the second device.

Exemplarily, the first relative azimuth may be determined by the second device through a positioning measurement.

Thus, after the first request message of the first device is received, the second device measures the first relative azimuth of the first device relative to the second device and transmits the first relative azimuth to the first device.

Exemplarily, the first relative azimuth may also be acquired by the second device from a third party measurement device. The third party measurement device is capable of measuring a first relative azimuth of the first device relative to the second device, or the third party measurement device knows the first relative azimuth of the first device relative to the second device.

Taking the first device A positioning the second device B as an example, after the request of the first device A is received, the second device does not need to perform measurement by itself, but queries the third-party measuring device M to obtain the first relative azimuth of the first device A relative to the second device B from the third-party measuring device M, and transmits the first relative azimuth obtain from the third-party measuring device M to the first device A.

It is to be noted that the present disclosure does not specifically limit how the third party measurement device M specifically measures the first relative azimuth of the first device A relative to the second device B. For example, what signal measurement is used by the third-party measuring device M and how the third-party measuring device M communicates with the second device B and the first device A are not limited. The motion states of the third-party measuring device M, the second device B, and the first device A are not limited in the present disclosure.

Thus, after the second device receives the first request message of the first device, the second device does not need to perform measurement by itself, but obtains the first relative azimuth of the first device relative to the second device from the preset database by querying the preset database, in which the first relative azimuth of the first device relative to the second device is pre-stored.

In some embodiments, the preset database may be a local database of the second device or a database to which the second device can be connected. For example, after the first request message from the first device is received, the second device may directly obtain the first relative azimuth from the local database of the second device. For another example, a third-party device with a preset database may be set, and after a first request message of the first device is received, the second device may establish a connection between the second device and the third-party device, and acquire a first relative azimuth pre-stored in the preset database from the database of the third-party device based on the second device. Taking the first device A positioning the second device B as an example, after the second device B receives the request from the first device A, the second device B does not need to perform measurement by itself, but queries the first relative azimuth of the first device A relative to the second device B from the preset database, and transmits the first relative azimuth obtained by querying from the preset database to the first device A.

In some embodiments, it is also possible to detect in real time whether the first relative azimuth of the first device A changes relative to the second device B. In the case where the first relative azimuth changes, the preset database may be updated based on the changed first relative azimuth. In other embodiments, the first relative azimuth in the preset database may also be updated at a preset time interval. For example, the historical first relative azimuth in the preset database is updated to the current first relative azimuth every 10 milliseconds (ms), herein the current first relative azimuth may be the first relative azimuth acquired at the current time. In this way, it is possible to ensure that the data in the preset database is in real time and accurate.

It is to be noted that the present disclosure does not specifically limit how the preset database obtains the first relative azimuth of the first device A relative to the second device B. The present disclosure does not limit the motion states of the second device B and the first device A.

Thus, after the second device receives the first request message of the first device, the second device does not need to perform measurement by itself, but queries the first relative azimuth of the first device relative to the second device from the preset database, and transmits the first relative azimuth queried from the preset database to the first device.

In some embodiments, the method further includes:

determining a relative distance between the first device and the second device; and determining position information of the second device relative to the first device based on the relative distance and the second relative azimuth.

The technical solution provided by the embodiments of the present disclosure may include the following advantages. In the present disclosure, the first device can determine the second relative orientation information of the second device relative to the first device according to the first geographic orientation information of the second device, the second geographic orientation information of the first device, and the first relative orientation information of the first device relative to the second device. By using the technical solution provided in the present disclosure, the first device can be used to determine the second relative orientation information of the second device relative to the first device, so that the first device can implement the accurate positioning of the second device. When the first device is a single-antenna device and the second device is a multi-antenna device, the positioning of the multi-antenna device can be implemented by the single-antenna device.

Figure 2:
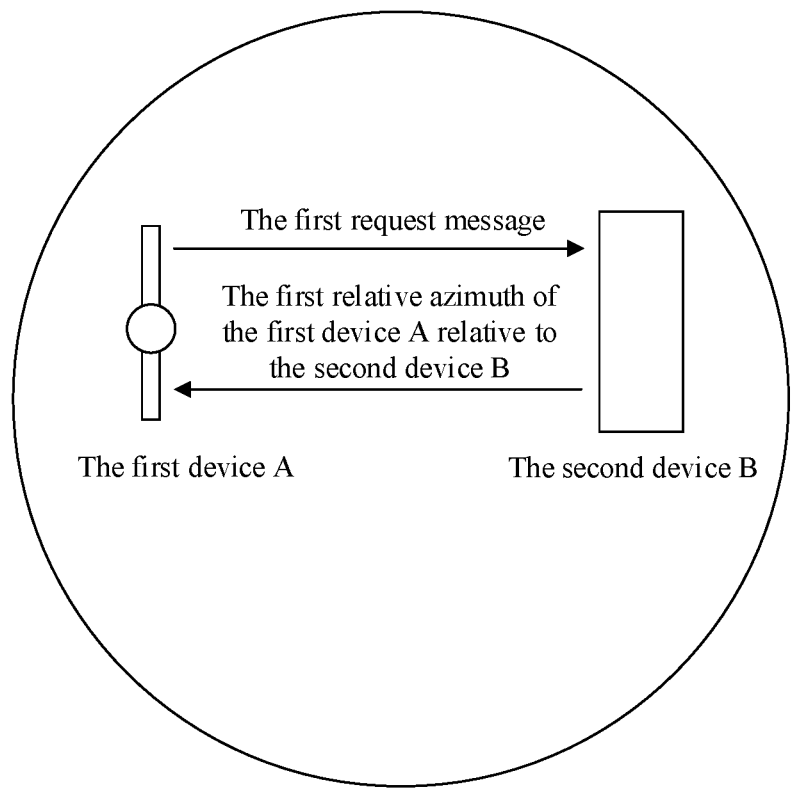
FIG. 2 is a first schematic diagram illustrating that a first device A implements the positioning for a second device B.

FIG. 2 illustrates a schematic diagram of the first device A implementing the positioning of the second device B. As shown in FIG. 2, when the second device B is positioned using the first device A with a single UWB antenna, since the first device A has only a single UWB antenna, only the distance information of the second device B relative to the first device A (including the relative distance between the first device and the second device) can be measured, and the angle information of the second device B relative to the first device A cannot be obtained.

In a scenario, the first device A may send a first request message to the second device B to request a first relative azimuth of the first device A relative to the second device B from the second device B, determine a second relative azimuth of the second device B relative to the first device A based on the first azimuth of the second device, the second azimuth angle of the first device, and the first relative azimuth, and determine the position information of the second device relative to the first device based on the distance information and the second relative azimuth. Herein the position information includes the distance information and the angle information of the second device B relative to the first device A.

It is to be understood that FIG. 2 is an alternative implementation, but is not limited thereto.

It is also to be understood that FIG. 2 is only for the purpose of illustrating the embodiment of the disclosure. various apparent changes and/or substitutions may be made by those skilled in the art based on the example of FIG. 2, and the obtained technical solutions still fall within the scope of the embodiments of the disclosure.

Herein, after the second relative azimuth of the second device relative to the first device is obtained, the relative distance between the first device and the second device may be determined by using the first device or the second device, and the position information of the second device relative to the first device is determined according to the relative distance and the second relative azimuth. For example, if the second relative azimuth of the second device relative to the first device is that the second device is located at 45 degrees north of the first device and the relative distance between the first device and the second device is 9 meters, it can be determined that the second device is located at 45 degrees north of the first device with the distance of 9 meters, so that the accurate position of the second device relative to the first device can be obtained.

In some embodiments, acquiring the first geographic orientation information of the second device and the first relative azimuth of the first device relative to the second device includes:

transmitting a first request message to the second device; and receiving the first geographic orientation information and the first relative azimuth, that are returned by the second device based on the first request message.

Herein, the first request message is a message initiated by the first device for requesting positioning of the second device. The first device may send the first request message to the second device and receive the first geographic orientation information and the first relative azimuth, that are returned by the second device in response to the received first request message. In this embodiment of the present disclosure, the request for positioning the second device is initiated by the first device, and when positioning the second device is required, the second device is requested to acquire its own first geographic orientation information and the first relative azimuth of the first device relative to the second device.

In some embodiments, the second device includes a multi-antenna device. The first device includes a single-antenna device. Taking the first device being a smart watch and the second device being a mobile phone as an example, the mobile phone can send a first relative azimuth of the smart watch relative to the mobile phone and the first geographic orientation information of the mobile phone to the smart watch. The smart watch can determine a second relative azimuth of the mobile phone relative to the smart watch according to the acquired first relative azimuth angle, the acquired first geographic orientation information, and the second geographic orientation information of the smart watch.

In some embodiments, the first geographic orientation information of the first device in the first coordinate system established on the basis of the geographic coordinate system may be determined. The second geographic orientation information of the second device in the second coordinate system established on the basis of the geographic coordinate system may be determined. The first relative orientation information is converted based on the first geographic orientation information and the second geographic orientation information to obtain the second relative orientation information.

In some embodiments, the first geographic orientation information includes a first azimuth of the second device in a first coordinate system, the second geographic orientation information includes a second azimuth of the first device in a second coordinate system, and the first relative orientation information includes a first relative azimuth of the first device relative to the second device.

Also taking the first device being a watch and the second device being a mobile phone as an example, the first azimuth determined by the mobile phone is a north-facing azimuth, and the mobile phone performs positioning on the watch based on the UWB to obtain the azimuth of the watch relative to the mobile phone, that is, the first relative azimuth is 60 degrees southwest, and the second azimuth determined by the mobile phone is a south-facing azimuth, then the azimuth of the mobile phone relative to the watch can be determined, that is, the second relative azimuth angle can be 60 degrees northeast. In the embodiment of the disclosure, the first azimuth of the second device in the geographical coordinate system and the second azimuth of the first device in the geographical coordinate system are determined respectively, and after the first relative azimuth is determined, the geographical coordinate system then can be used as the intermediate reference coordinate system, and the second relative azimuth of the second device relative to the first device can be determined, thereby realizing positioning of the mobile phone by the watch.

In some embodiments, the first relative orientation information includes a first relative azimuth of the first device in a third coordinate system established based on the second device. The second relative orientation information includes a second relative azimuth of the second device in a fourth coordinate system established based on the first device.

Converting the first relative orientation information, based on the first geographic orientation information and the second geographic orientation information, to obtain the second relative orientation information includes:

determining a third relative azimuth of the first device in the second coordinate system based on the first relative azimuth and a first conversion relationship between the third coordinate system and the second coordinate system, herein the first conversion relationship is determined according to the angle between the second device and each of the coordinate axes in the second coordinate system;

determining a fourth relative azimuth of the second device in the first coordinate system based on the third relative azimuth; and converting the fourth relative azimuth into the fourth coordinate system to obtain the second relative azimuth based on the fourth relative azimuth and a second conversion relationship between the first coordinate system and the fourth coordinate system, herein the second conversion relationship is determined according to the angle between the first device and each of the coordinate axes in the first coordinate system.

In some embodiments, determining the fourth relative azimuth of the second device in the first coordinate system according to the third relative azimuth includes: obtaining the fourth relative azimuth of the second device in the first coordinate system based on the relationship that the third relative azimuth and the fourth relative azimuth are symmetric about an origin.

Figure 3:
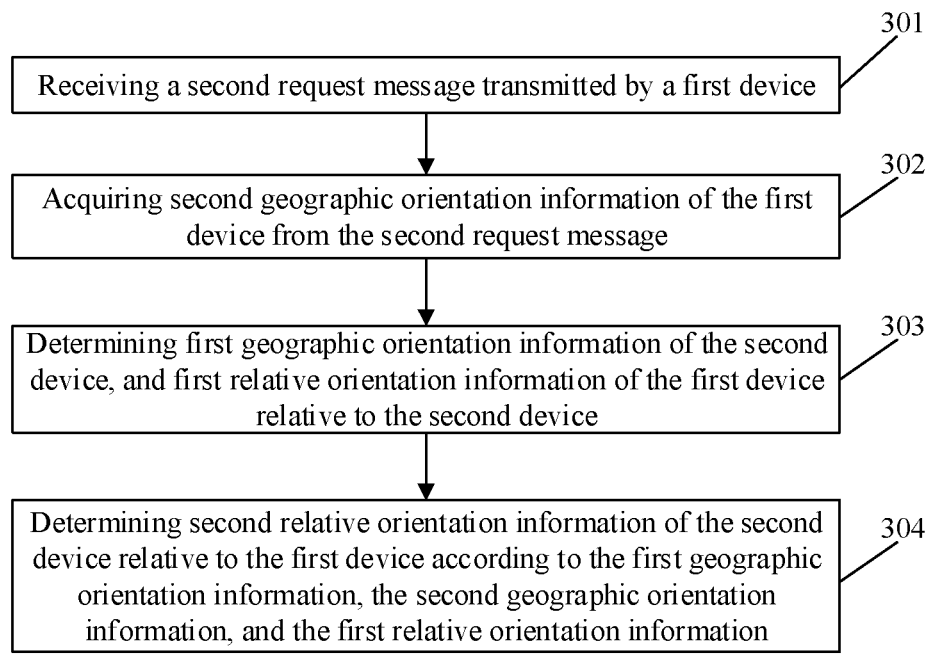
FIG. 3 is a flowchart illustrating another positioning method according to at least some embodiments.

FIG. 3 is a flowchart illustrating another positioning method according to at least some embodiments. As shown in FIG. 3, the method is applied to the second device, and the positioning method includes the steps 301 to 304. Here, the first device may be referred as the sending device, the second device may be referred as the receiving device.

In step 301, a second request message sent by the first device is received.

In step 302, the second geographic orientation information of the first device is acquired from the second request message.

In step 303, the first geographic orientation information of the second device and the first relative orientation information of the first device relative to the second device are determined.

In step 304, the second relative orientation information of the second device relative to the first device is determined according to the first geographic orientation information, the second geographic orientation information, and the first relative orientation information.

Herein, the second request message is a message initiated by the first device for requesting positioning of the second device, and the first device may send the second request message carrying the second geographic orientation information to the second device. After the second request message is received, the second device can parse the second geographic orientation information from the second request message. Further, the second relative orientation information of the second device relative to the first device is determined based on the second geographic orientation information, the first geographic orientation information of the second device, and the first relative orientation information of the first device relative to the second device.

In the embodiment of the disclosure, in the case where the second device is a multi-antenna device, the second relative orientation information of the second device relative to the first device can be determined through the positioning data provided by the first device.

In some embodiments, the method further includes: transmitting the second relative orientation information to the first device.

After the second relative orientation information of the second device relative to the first device is acquired, the second device can send the second relative orientation information to other external devices. For example, the second relative orientation information can be sent to the first device. Thus, the first device can acquire the second relative orientation information of the second device relative to the first device, and then determine the accurate position between the first device and the second device according to the relative distance between the first device and the second device, so that positioning of the second device by the first device can be implemented.

Figure 4:
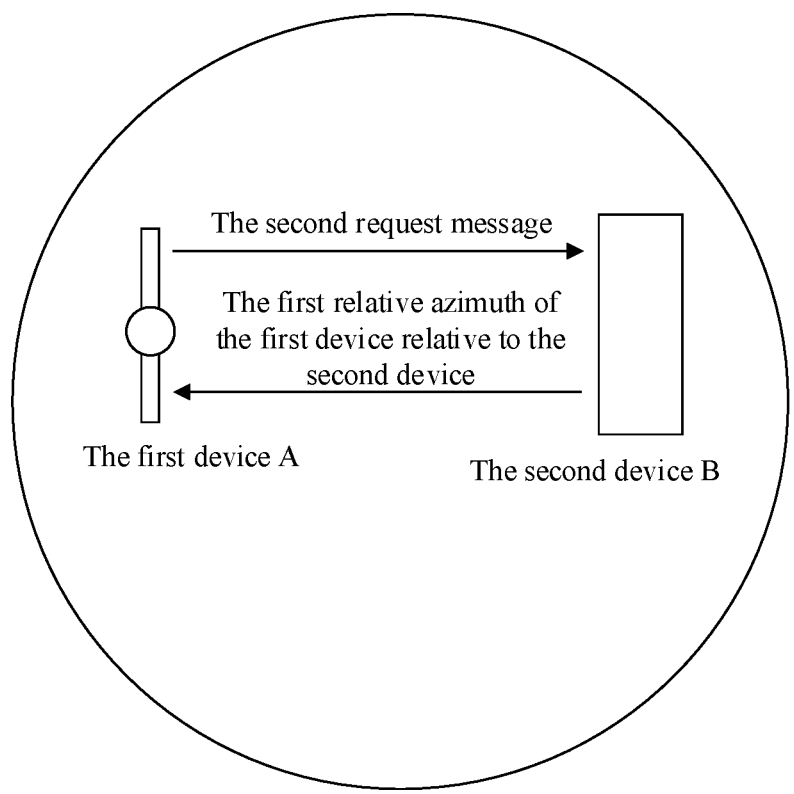
FIG. 4 is a second schematic diagram illustrating that a first device A implements the positioning for a second device B.

FIG. 4 illustrates a second schematic diagram of the first device A implementing the positioning of the second device B. As shown in FIG. 4, when the second device B is positioned using the first device A with a single UWB antenna, since the first device A has only a single UWB antenna, only the distance information of the second device B relative to the first device A (including the relative distance between the first device and the second device) can be measured, and the angle information of the second device B relative to the first device A cannot be obtained.

In a scenario, the first device A may send a second request message carrying a second azimuth of the first device A to the second device B, to request to obtain a first relative azimuth of the first device A relative to the second device B from the second device B, and to request the second device to determine a second relative azimuth of the second device B relative to the first device A according to the first azimuth of the second device, the second azimuth of the first device, and the first relative azimuth, and to send the second relative azimuth to the first device A.

In some embodiments, after determining the second relative azimuth, the position information of the second device relative to the first device may be determined based on the relative distance and the second relative azimuth, herein the position information includes the distance information and the angle information of the second device B relative to the first device A. In other embodiments, the relative distance and the second relative azimuth may be processed based on the first device to obtain the position information of the second device relative to the first device. Or the relative distance and the second relative azimuth may be processed based on the second device to obtain the position information of the second device relative to the first device.

It is to be understood that FIG. 4 is an alternative implementation, but is not limited thereto. It is also to be understood that FIG. 4 is only for the purpose of illustrating the embodiment of the disclosure, and that various obvious changes and/or substitutions may be made by those skilled in the art based on the example of FIG. 4, and the resulting technical solution still falls within the scope of the embodiment of the disclosure.

In some embodiments, the first geographic orientation information includes a first azimuth of the second device in a geographic coordinate system; the second geographic orientation information includes a second azimuth of the first device in the geographic coordinate system; and the first relative orientation information includes a first relative azimuth of the first device relative to the second device.

Determining the second relative orientation information of the second device relative to the first device according to the first geographic orientation information, the second geographic orientation information, and the first relative orientation information includes:

obtaining a second relative azimuth of the second device relative to the first device according to the first azimuth, the second azimuth, and the first relative azimuth.

In some embodiments, the method further includes:

determining a relative distance between the first device and the second device; and determining the position information of the second device relative to the first device based on the relative distance and the second relative orientation information.

In some embodiments, the second device includes a multi-antenna device, and the first device includes a single-antenna device.

In some embodiments, the first device is a smart watch and the second device is a mobile phone, where the smart watch may have one UWB antenna and the mobile phone may have multiple UWB antennas. When the smart watch is used for positioning the mobile phone, the mobile phone can obtain the distance (i.e., the relative distance) of the watch relative to the mobile phone and the relative orientation information (i.e., the first relative orientation information). The current absolute azimuth (the first azimuth) of the mobile phone can be calculated by the geomagnetic sensor, the acceleration sensor and the gravity sensor of the mobile phone. The current absolute azimuth (the second azimuth) of the smart watch can be calculated by the geomagnetic sensor, the acceleration sensor and the gravity sensor of the smart watch.

In some embodiments, the positioning information (including the relative distance, the first relative orientation information, and the first azimuth) obtained by the mobile phone may be transmitted to the smart watch side via communication manners such as Bluetooth or UWB. The smart watch can perform calculation to acquire the orientation (the second relative orientation information) of the mobile phone relative to the watch based on the relative orientation information, the absolute azimuth of the mobile phone, and the absolute azimuth of the watch, and further obtain the accurate position of the mobile phone relative to the watch according to the relative distance between the mobile phone and the smart watch and the second relative orientation information.

In some embodiments, the positioning information (including a second azimuth) obtained by the watch may be transmitted to the mobile phone via communication manners such as Bluetooth or UWB. The mobile phone may perform calculation to obtain the orientation (the second relative orientation information) of the mobile phone relative to the watch based on the relative orientation information, the absolute azimuth of the mobile phone, and the absolute azimuth of the watch, and further obtain the accurate position of the mobile phone relative to the watch according to the relative distance between the mobile phone and the smart watch and the second relative orientation information, and transmit the position information of the mobile phone relative to the smart watch to the smart watch.

With the positioning method of the present disclosure, positioning the multiple UWB antennas device by the single UWB antenna can be implemented, and the functions of the single-antenna device can be effectively expanded.

In some embodiments, the first geographic orientation information, the second geographic orientation information, and the first relative orientation information may also be obtained by other UWB devices or peripheral UWB anchors around the devices.

In some embodiments, other communication manners, such as the wireless local area network or the mobile communication network, which is not specifically limited herein, may be used for information exchange between the mobile phone and the smart watch.

In some embodiments, the second device may be a multi-antenna device such as a vehicle-mounted multi-anchor UWB positioning system, and the first device may be a single-antenna device such as a wireless headset with a sensor and a single UWB antenna.

According to the technical solution in the present disclosure, the multi-antenna device and the single-antenna device can determine their own absolute azimuth, and exchange information, such as the azimuth, the position and the distance, between the multi-antenna device and the single-antenna device, so as to implement positioning of the multi-antenna device by the single-antenna device.

An embodiment of the present disclosure further provides a positioning method applied to a second device. The method includes:

receiving a third request message transmitted by the first device;

determining first geographic orientation information of the second device and third relative orientation information of the first device relative to the second device; and transmitting the first geographical orientation information and the third relative orientation information to the first device.

Herein, the third request message is a message initiated by the first device for requesting positioning of the second device. After receiving the third request message, the second device can determine the first geographic orientation information of the second device and the third relative orientation information of the first device relative to the second device, and send the first geographic orientation information and the third relative orientation information to the first device.

In the embodiment of the disclosure, in the case where the second device is a multi-antenna device, the positioning data may be determined based on the second device, and the positioning data is sent to the first device for the first device to implement positioning of the second device.

Figure 5:
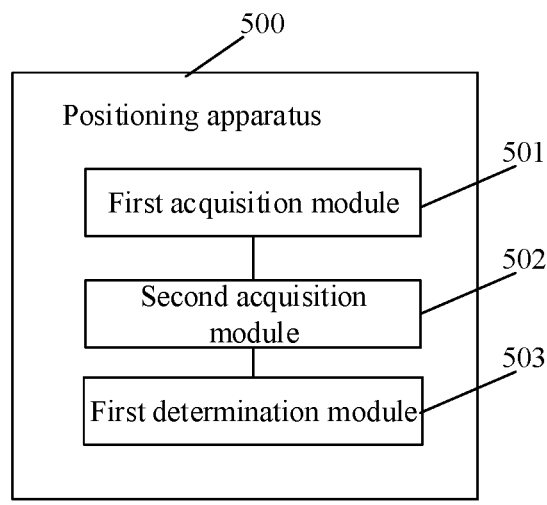
FIG. 5 is a block diagram illustrating a positioning apparatus according to at least some embodiments.

FIG. 5 is a block diagram illustrating a positioning apparatus according to at least some embodiments. As shown in FIG. 5, the positioning apparatus 500 is applied to a first device and mainly includes:

a first acquisition module 501, configured to acquire first geographic orientation information of a second device and first relative orientation information of the first device relative to the second device;

a second acquisition module 502, configured to acquire second geographic orientation information of the first device; and a first determination module 503, configured to determine second relative orientation information of the second device relative to the first device according to the first geographic orientation information, the second geographic orientation information, and the first relative orientation information.

In some embodiments, the first geographic orientation information includes a first azimuth of the second device in a geographic coordinate system, the second geographic orientation information includes a second azimuth of the first device in the geographic coordinate system, and the first relative orientation information includes a first relative azimuth of the first device relative to the second device.

The first determination module 503 is further configured to:

obtain a second relative azimuth of the second device relative to the first device according to the first azimuth, the second azimuth, and the first relative azimuth.

In some embodiments, the apparatus 500 further includes:

a second determination module, configured to determine a relative distance between the first device and the second device;

a third determination module, configured to determine position information of the second device relative to the first device based on the relative distance and the second relative orientation information.

In some embodiments, the first acquisition module 501 is further configured to:

transmit a first request message to the second device; and receive the first geographic orientation information and the first relative orientation information, that are returned by the second device based on the first request message.

In some embodiments, the second device includes a multi-antenna device, and the first device includes a single-antenna device.

Figure 6:
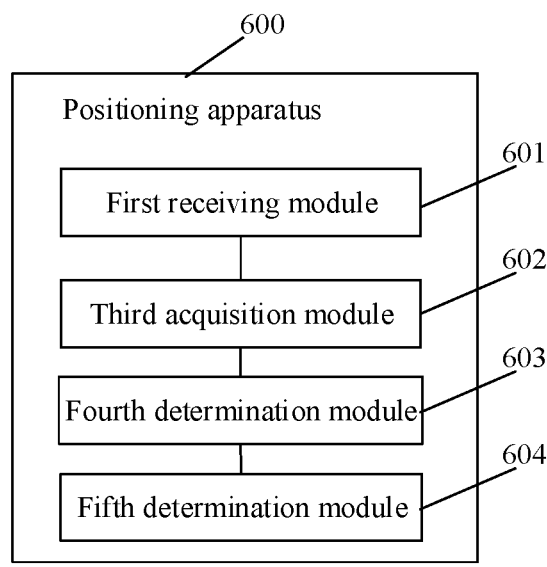
FIG. 6 is a block diagram illustrating another positioning apparatus according to at least some embodiments.

FIG. 6 is a block diagram illustrating another positioning apparatus according to at least some embodiments. As shown in FIG. 6, the positioning apparatus 600 is applied to a second device, and mainly includes:

a receiving module 601, configured to receive a second request message transmitted by a first device;

a third acquisition module 602, configured to acquire second geographic orientation information of the first device from the second request message;

a fourth determination module 603, configured to determine first geographic orientation information of the second device and first relative orientation information of the first device relative to the second device; and a fifth determining module 604, configured to determine second relative orientation information of the second device relative to the first device according to the first geographic orientation information, the second geographic orientation information, and the first relative orientation information.

In some embodiments, the apparatus 600 further includes:

a first transmitting module, configured to transmit the second relative orientation information to the first device.

The specific manners, in which the various modules of the apparatus in the above-described embodiments perform operations, have been described in detail in the embodiments regarding the methods, and will not be elaborated herein.

An embodiment of the present disclosure further provides a positioning apparatus applied to a second device. The apparatus includes:

a second receiving module, configured to receive a third request message transmitted by the first device;

a sixth determination module, configured to determine first geographic orientation information of the second device and third relative orientation information of the first device relative to the second device; and a second transmitting module, configured to transmit the first geographic orientation information and the third relative orientation information to the first device.

Figure 7:
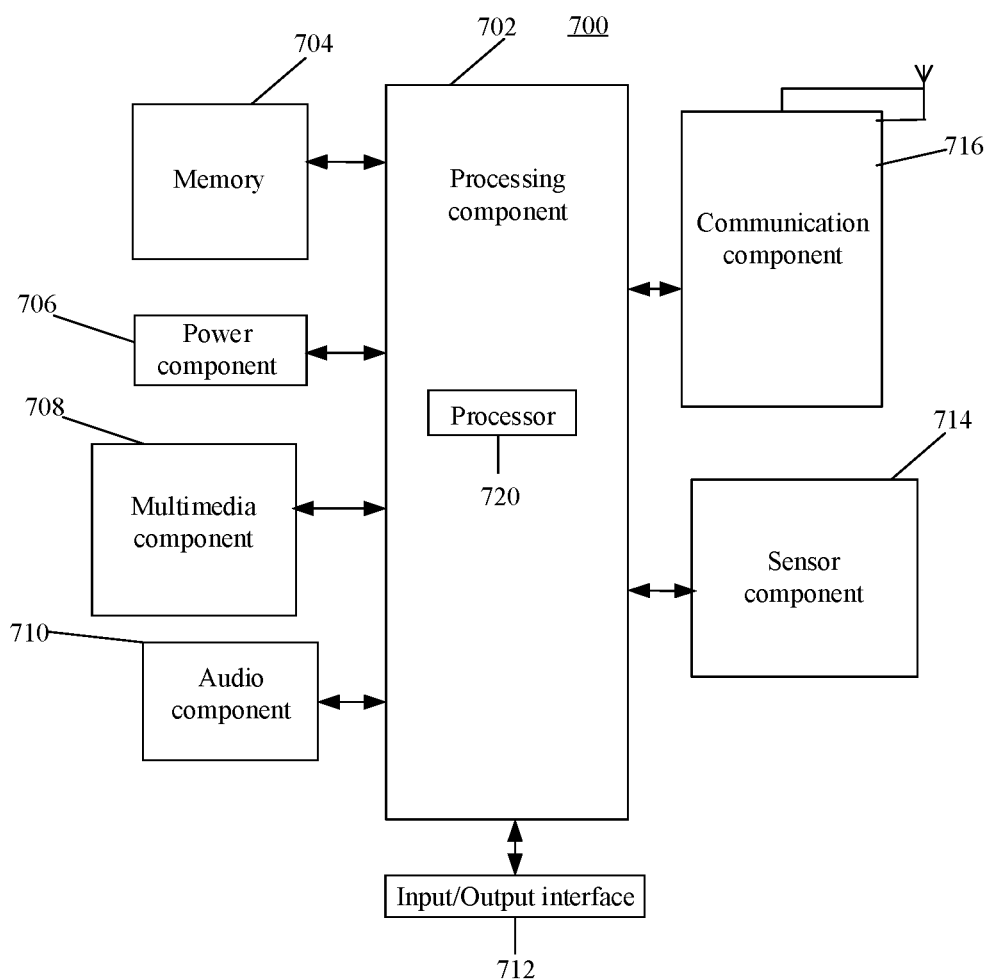
FIG. 7 is a block diagram illustrating the hardware of a positioning device according to at least some embodiments.

FIG. 7 is a block diagram illustrating the hardware of a positioning device 700 according to at least some embodiments. For example, the device 700 may be a mobile phone, a computer, a digital broadcast terminal, a messaging device, a game console, a tablet device, a medical device, an exercise device, a personal digital assistant, or the like.

Referring to FIG. 7, the device 700 may include one or more of a processing component 702, a memory 704, a power component 706, a multimedia component 708, an audio component 710, an input/output (I/O) interface 712, a sensor component 714, and a communication component 716.

The processing component 702 generally controls the overall operations of the device 700, such as the operations associated with display, telephone calls, data communications, camera operations, and recording operations. The processing component 702 may include one or more processors 720 to execute instructions to perform all or part of the steps of the methods as described above. In addition, the processing component 702 may include one or more modules to facilitate the interaction between the processing component 702 and other components. For example, the processing component 702 may include a multimedia module to facilitate the interaction between the multimedia component 708 and the processing component 702.

The memory 704 is configured to store various types of data to support the operation of the device 700. Examples of such data include instructions for any applications or methods operated on the device 700, contact data, phone book data, messages, pictures, video, etc. The memory 704 may be implemented using any type of volatile or non-volatile storage device, such as a Static Random Access Memory (SRAM), an Electrically Erasable Programmable Read Only Memory (EEPROM), an Erasable Programmable Read-only Memory (EPROM), a Programmable Read-only Memory (PROM), a Read-only Memory (ROM), a magnetic memory, a flash memory, a magnetic disk, or optical disk, or a combination thereof.

The power component 706 provides power to various components of the device 700. The power component 706 may include a power management system, one or more power sources, and any other components associated with the generation, management, and distribution of power for the device 700.

The multimedia component 708 includes a screen providing an output interface between the device 700 and the user. In some embodiments, the screen may include a Liquid Crystal Display (LCD) and a Touch Panel (TP). If the display screen includes the touch panel, the display screen may be implemented as a touch screen to receive input signals from the user. The touch panel includes one or more touch sensors to sense the touches, swipes, and gestures on the touch panel. The touch sensor may not only sense the boundary of a touch or swipe action, but also detect the duration and pressure associated with the touch or swipe operation. In some embodiments, the multimedia component 708 includes a front camera and/or a rear camera. The front camera and/or the rear camera may receive an external multimedia data when the device 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone (MIC) configured to receive an external audio signal when the device 700 is in an operation mode, such as a call mode, a recording mode, and a voice recognition mode. The received audio signal may be further stored in the memory 704 or transmitted via the communication component 716. In some embodiments, the audio component 710 further includes a speaker for outputting audio signals.

The I/O interface 712 provides an interface between the processing component 702 and a peripheral interface module, which may be a keyboard, a click wheel, a button, or the like. These buttons may include, but are not limited to, a home button, a volume button, an starting button, and a locking button.

The sensor component 714 includes one or more sensors for providing a state assessment of various aspects of the device 700. For example, the sensor component 714 may detect an on/off state of the device 700, a relative positioning of the components, such as the display and the keypad of the device 700. The sensor component 714 may also detect a change in position of the device 700 or a component of the device 700, the presence or absence of user contact with the device 700, the orientation or acceleration/deceleration of the device 700, and a change in temperature of the device 700. The sensor component 714 may include a proximity sensor configured to detect the presence of a nearby object without any physical contact. The sensor component 714 may also include a light sensor, such as a CMOS or CCD image sensor, for use in imaging applications. In some embodiments, the sensor component 714 may also include an acceleration sensor, a gyroscope sensor, a magnetic sensor, a pressure sensor, or a temperature sensor.

The communication component 716 is configured to facilitate communication, wired or wirelessly, between the device 700 and other devices. The device 700 can access a wireless network based on a communication standard, such as Wi-Fi, or 2G, or 3G, or 4G, or 5G, or a combination thereof. In one exemplary embodiment, communication component 716 receives a broadcast signal or broadcast-related information from an external broadcast management system via a broadcast channel. In one exemplary embodiment, the communication component 716 further includes a Near Field Communication (NFC) module to facilitate short-range communications. For example, the NFC module may be implemented based on a Radio Frequency Identification (RFID) technology, an Infrared Data Association (IrDA) technology, an Ultra-Wideband (UWB) technology, a Bluetooth (BT) technology, and other technologies.

In at least some embodiments, the device 700 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components, for performing the methods described above.

In at least some embodiments, there is also provided a non-transitory computer-readable storage medium including instructions, such as the memory 704 including instructions executable by the processor 720 of the device 700 to perform the above-described methods. For example, the non-transitory computer-readable storage medium may be a ROM, a Random Access Memory (RAM), a CD-ROM, a magnetic tape, a floppy disk, an optical data storage device, or the like.

A non-transitory computer-readable storage medium, when instructions in the storage medium are executed by a processor of a positioning device, causes the positioning device to perform a positioning method, that is applied to a first device. The method includes:

acquiring first geographic orientation information of a second device and first relative orientation information of the first device relative to the second device;

acquiring second geographic orientation information of the first device; and determining second relative orientation information of the second device relative to the first device according to the first geographic orientation information, the second geographic orientation information, and the first relative orientation information.

Another non-transitory computer-readable storage medium, when instructions in the storage medium are executed by a processor of a positioning device, causes the positioning device to perform a positioning method, that is applied to a second device. The method includes:

receiving a second request message transmitted by the first device;

acquiring the second geographic orientation information of the first device from the second request message;

determining the first geographic orientation information of the second device and first relative orientation information of the first device relative to the second device; and determining the second relative orientation information of the second device relative to the first device according to the first geographic orientation information, the second geographic orientation information, and the first relative orientation information.

Another non-transitory computer-readable storage medium, when instructions in the storage medium are executed by a processor of a positioning device, causes the positioning device to perform a positioning method, that is applied to a second device. The method includes:

receiving a third request message transmitted by the first device;

determining first geographic orientation information of the second device and third relative orientation information of the first device relative to the second device; and transmitting the first geographical orientation information and the third relative orientation information to the first device.

Other embodiments of the present disclosure will be apparent to those skilled in the art from consideration of the specification and practice of the invention disclosed herein. This disclosure is intended to cover any variations, uses, or adaptations of this disclosure following the general principles thereof and including such departures from the present disclosure as come within known or customary practice in the art. It is intended that the specification and examples be regarded as exemplary only, with a true scope and spirit of the present disclosure being indicated by the following claims.

It is to be understood that the present disclosure is not limited to the exact construction that has been described above and illustrated in the accompanying drawings, and that various modifications and changes may be made without departing from the scope thereof. It is intended that the scope of the present disclosure is limited only by the appended claims.

What is claimed is:

1. A positioning method applied to a first device, the method comprising:
   acquiring, from a second device, first geographic orientation information of the second device and first relative orientation information of the first device relative to the second device, wherein the second device comprises a multi-antenna device, the first device comprises a single-antenna device, and the first relative orientation information is determined through a plurality of antennas of the second device;
   acquiring second geographic orientation information of the first device; and
   determining second relative orientation information of the second device relative to the first device according to the first geographic orientation information, the second geographic orientation information, and the first relative orientation information.

2. The positioning method of claim 1, wherein the first geographical orientation information comprises a first azimuth of the second device in a geographical coordinate system; the second geographical orientation information comprises a second azimuth of the first device in the geographical coordinate system; and the first relative orientation information comprises a first relative azimuth of the first device relative to the second device.

3. The positioning method of claim 2, wherein determining the second relative orientation information of the second device relative to the first device according to the first geographic orientation information, the second geographic orientation information, and the first relative orientation information comprises:
   obtaining a second relative azimuth of the second device relative to the first device according to the first azimuth, the second azimuth, and the first relative azimuth.

4. The positioning method of claim 1, further comprising:
   determining a relative distance between the first device and the second device; and
   determining position information of the second device relative to the first device based on the relative distance and the second relative orientation information.

5. The positioning method of claim 1, wherein acquiring, from the second device, the first geographical orientation information of the second device and the first relative orientation information of the first device relative to the second device comprises:

transmitting a first request message to the second device; and receiving the first geographic orientation information and the first relative orientation information.

6. The positioning method of claim 5, wherein the first geographic orientation information and the first relative orientation information are returned by the second device based on the first request message.

7. A positioning device comprising:
one or more processors; and
a memory for storing executable instructions;
wherein the one or more processor are configured to execute the executable instructions to implement the positioning method of claim 1.

8. A positioning method applied to a second device, the method comprising:

receiving a request message transmitted by a first device;

acquiring second geographic orientation information of the first device from the request message;

determining first geographic orientation information of the second device, and first relative orientation information of the first device relative to the second device, wherein the second device comprises a multi-antenna device, the first device comprises a single-antenna device, and the first relative orientation information is determined through a plurality of antennas of the second device;

determining second relative orientation information of the second device relative to the first device according to the first geographic orientation information, the second geographic orientation information, and the first relative orientation information; and transmitting the second relative orientation information to the first device.

9. A positioning device comprising:
one or more processors; and
a memory for storing executable instructions;
wherein the one or more processors are configured to execute the executable instructions to implement the positioning method of claim 8.

10. A positioning method applied to a second device, the method comprising:

receiving a first request message transmitted by a first device, the first request message being a message for requesting positioning of the second device;

determining first geographic orientation information of the second device and first relative orientation information of the first device relative to the second device, wherein the second device comprises a multi-antenna device, the first device comprises a single-antenna device, and the relative orientation information is determined through a plurality of antennas of the second device; and transmitting the first geographical orientation information and the first relative orientation information to the first device.

11. A positioning device comprising:
one or more processors; and
a memory for storing executable instructions;
wherein the one or more processors are configured to execute the executable instructions to implement the positioning method of claim 10.

* * * * *